United States Patent [19]

Belford

[11] Patent Number: 5,062,394

[45] Date of Patent: Nov. 5, 1991

[54] MECHANISM FOR CONVERTING RECIPROCATORY MOTION INTO ROTARY MOTION IN AN ENGINE

[76] Inventor: James R. Belford, 184 Lake Shore Dr., Pasadena, Md. 21122

[21] Appl. No.: 423,562

[22] Filed: Oct. 13, 1989

Related U.S. Application Data

[63] Continuation-in-part of Ser. No. 71,103, Jul. 8, 1987, abandoned.

[51] Int. Cl.$^5$ .............................................. F02B 75/24
[52] U.S. Cl. ............................ 123/56 AC; 123/197 R; 123/48 B
[58] Field of Search ........... 123/58 R, 56 AC, 56 BC, 123/59 R, 59 A, 59 B, 197 R, 197 AC, 48 B, 78 BA, 78 E

[56] References Cited

U.S. PATENT DOCUMENTS

| | | | |
|---|---|---|---|
| 1,123,172 | 12/1914 | Compton | 123/197 AC |
| 1,399,666 | 12/1921 | Short | 123/56 AC |
| 1,636,612 | 7/1927 | Noah | 123/197 R |
| 1,687,744 | 10/1928 | Webb | 123/197 R |
| 3,886,805 | 6/1975 | Koderman | 123/197 AC |
| 4,395,977 | 8/1983 | Pahis | 123/197 AC |
| 4,608,951 | 9/1986 | White | 123/197 AC |
| 4,658,768 | 4/1987 | Carson | 123/197 AC |

FOREIGN PATENT DOCUMENTS

| | | | |
|---|---|---|---|
| 3607422 | 9/1987 | Fed. Rep. of Germany | 123/197 R |
| 0909250 | 3/1982 | U.S.S.R. | 123/56 R |

*Primary Examiner*—David A. Okonsky
*Attorney, Agent, or Firm*—Millen, White & Zelano

[57] ABSTRACT

A two stroke reciprocating internal combustion or external compression engine which has at least two of needed power connecting posts mounted on each end of a carrier mechanical assembly which slides in a guided area by virtue of the engine's stator design. In the carrier assembly there is incorporated an oval-type, internally toothed gear track which moves in reciprocating, linear motion. A circular, externally toothed gear is mounted on a rotatable, floating power shaft which extends perpendicular to the carrier. In that the gear is in constant engagement with the oval gear track, it is rotated by the linear movement of the reciprocating carrier. Proper gear engagement is insured by either a guider plate of by interlocking rollers in the carrier assembly. The output power end of the floating shaft is received in a mechanical unit which couples the floating shaft to an output shaft for use.

6 Claims, 14 Drawing Sheets

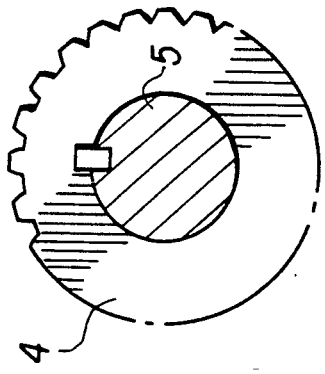
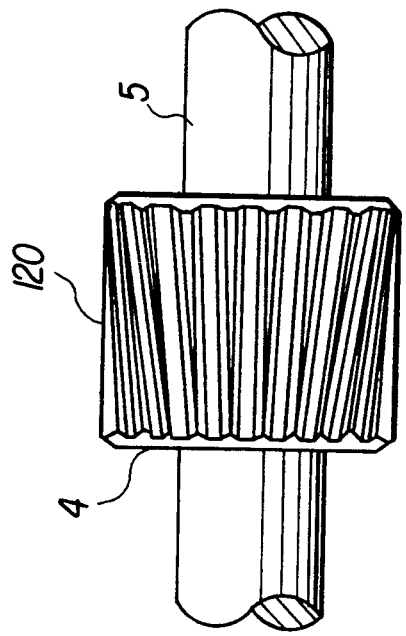

1

MECHANISM FOR CONVERTING RECIPROCATORY MOTION INTO ROTARY MOTION IN AN ENGINE

This application is a continuation-in-part of application Ser. No. 07/071,103, filed July 8, 1987, now abandoned.

BACKGROUND OF THE INVENTION

This invention relates to either a two stroke, reciprocating internal combustion or to an external compression engine.

Generally internal combustion engines, and the like, rely on crank shafts to convert the linear reciprocating motion of pistons to rotary motion. This is however a relatively complex, power consuming approach to motion conversion. The following patents are indicative of attempts to replace crank shafts with other types of mechanisms:

| | | |
|---|---|---|
| 370,709 | 09/1887 | Mathias et al |
| 712,361 | 10/1902 | Clarke |
| 1,123,172 | 12/1914 | Compton |
| 1,703,497 | 02/1929 | Noah |
| 1,885,298 | 11/1932 | Schell |
| 2,312,057 | 02/1943 | Williams |
| 3,945,358 | 03/1976 | Collins |
| 4,395,977 | 08/1983 | Pahis |

The above listed patents disclose devices which are generally impractical or overly complex and have never been of commercial significance.

OBJECTS OF THE INVENTION

The principal object of the invention is to convert linear reciprocating motion to smooth continuous rotating motion by use of a guided floating shaft assembly.

Other objects of the invention are to:

1. replace conventional crank shafts with a guided floating shaft assembly which applies direct force on toothed gears during expansion and all other cycles of devices such as internal combustion engines;

2. increase power output of engines as compared to conventional crank shaft engine which conventional engine experience power loss due to the change of the angular crank shaft position;

3. increase engine revolutions (RPM) at the floating shaft assembly for each stroke of the engine;

4. allow the flywheel of an internal combustion engine or the like to be placed either perpendicular to or in line with the body of the engine;

5. reduce the number of moving parts per power outlet;

6. reduce engine size by having a carriage block slider entering the cylinder wall area;

7. reduce weight due to power gained by using a floating shaft concept;

8. reduce component wear by reducing engine speed;

9. reduce exhaust noise levels by lowering exhaust gas pressure through increasing the reciprocating stroke length.

10. increase the engine's power output by increasing the expansion stroke simply through increasing the length of the straight part of an oval gear assembly used with the invention.

SUMMARY OF THE INVENTION

In accordance with one embodiment of the invention, the engine comprises two or more conventional piston assemblies opposed for providing the reciprocating motion needed to maintain proper movement of a slider block carriage assembly. The piston assemblies are connected to the sliding block carriage assembly at the ends thereof by a connecting post. The resulting mechanical assembly moves in reciprocating motion and is guided by a stator designed to assure straight and smooth linear operation, thus facilitating transformation of reciprocating motion into continuous rotating motion. The mechanical assembly includes two linear, parallel toothed tracks of equal length. The opposed linear tracks are connected at each end by two semi-circular, gear tracks of equal circumference, thus providing a continuous equally toothed gear arrangement. Power transfer from the tracks is accomplished by an externally toothed, circular, drive gear mounted on a floating shaft which extends perpendicular to said mechanical assembly. The drive gear is guided by an interlocked guider assembly which tracks the profile of the geared mechanical assembly with an interlocking roller assembly which is journaled to a floating shaft supporting the drive gear or proper guidance is maintained by a slotted plate affixed to the mechanical assembly carriage block. This arrangement guides the distal end of the floating shaft so as to continue rotation about the connecting circumference of the geared track, thus aligning the drive gear to receive the appropriately developing power of the pistons. This results in vertically movement of the floating shaft. The vertically movement is held true by means of thrust posts mounted to the engine stator. The thrusts posts will also absorb torque developed by the reciprocating motion of the mechanical assembly and transfer the torque to a floating shaft which rotates in bearings. Thus, the rotating power and vertical movement are both transferred to a power receiving unit. The power receiving unit comprises a constant velocity joint which is directly connected to an output shaft or a thrust angulating housing assembly may be used to distribute both the rotating power and the vertical movement of the floating shaft to a journaled output shaft. The output is directly connected to an output shaft mounted in a drive bearing fitted with an external toothed circular gear which drives a multi-purpose flywheel. The flywheel is journalled to an independent accessory drive shaft. The distal end of the drive shaft accepts need apparatus to drive required engine accessories.

While a preferred arrangement utilizes an internal combustion engine other prime movers may be utilized such as solenoids or mechanical movements.

BRIEF DESCRIPTION OF THE DRAWINGS

FIG. 17 is an end view of the year which runs on the track; and

FIG. 18 is a side view of the gear of FIG. 17.

DESCRIPTION OF THE PREFERRED EMBODIMENTS

Figure 1:
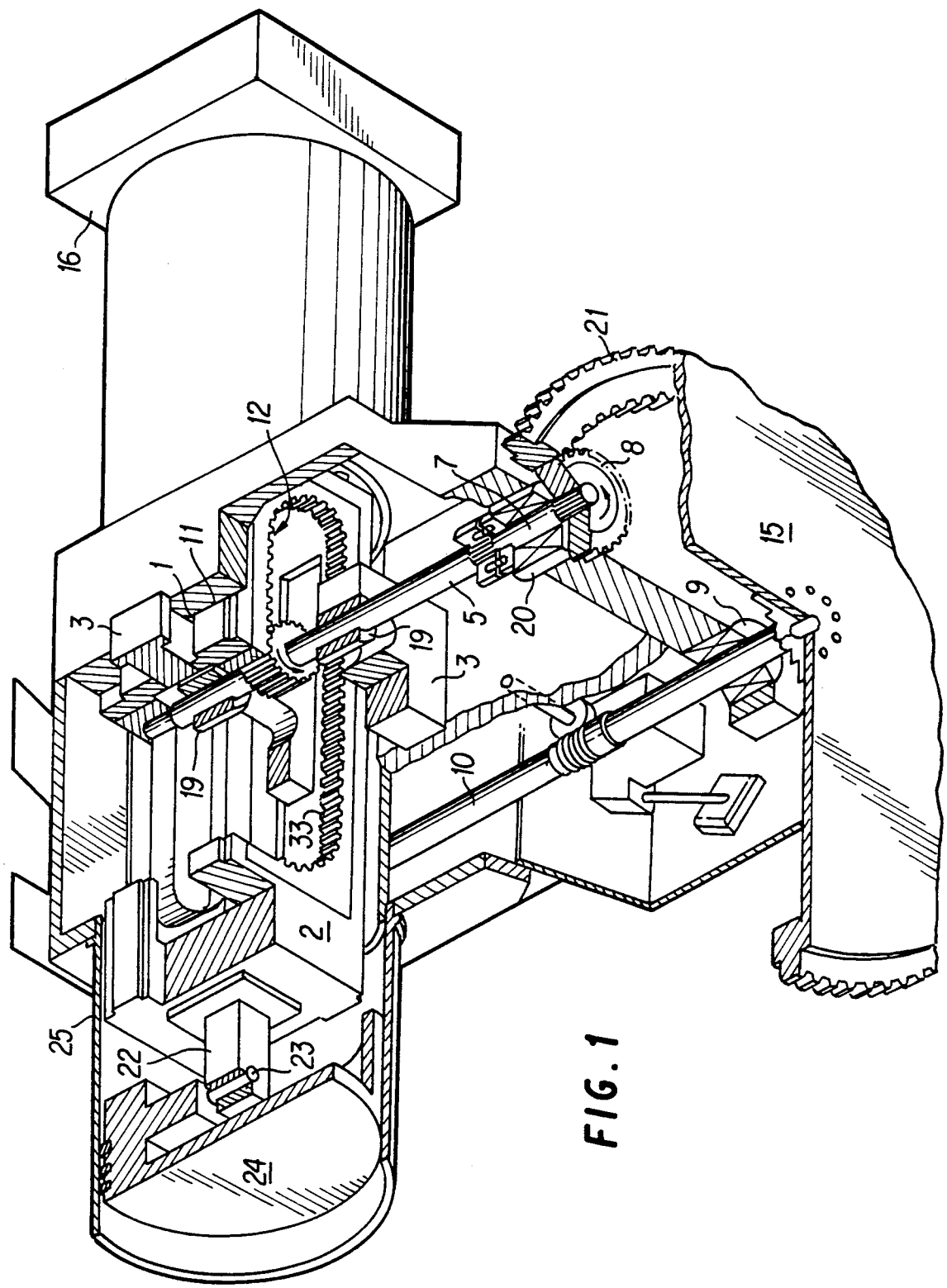
FIG. 1 is a perspective view, partially cut away, of a first embodiment of an engine configured in accordance with the instant invention.
Figure 2:
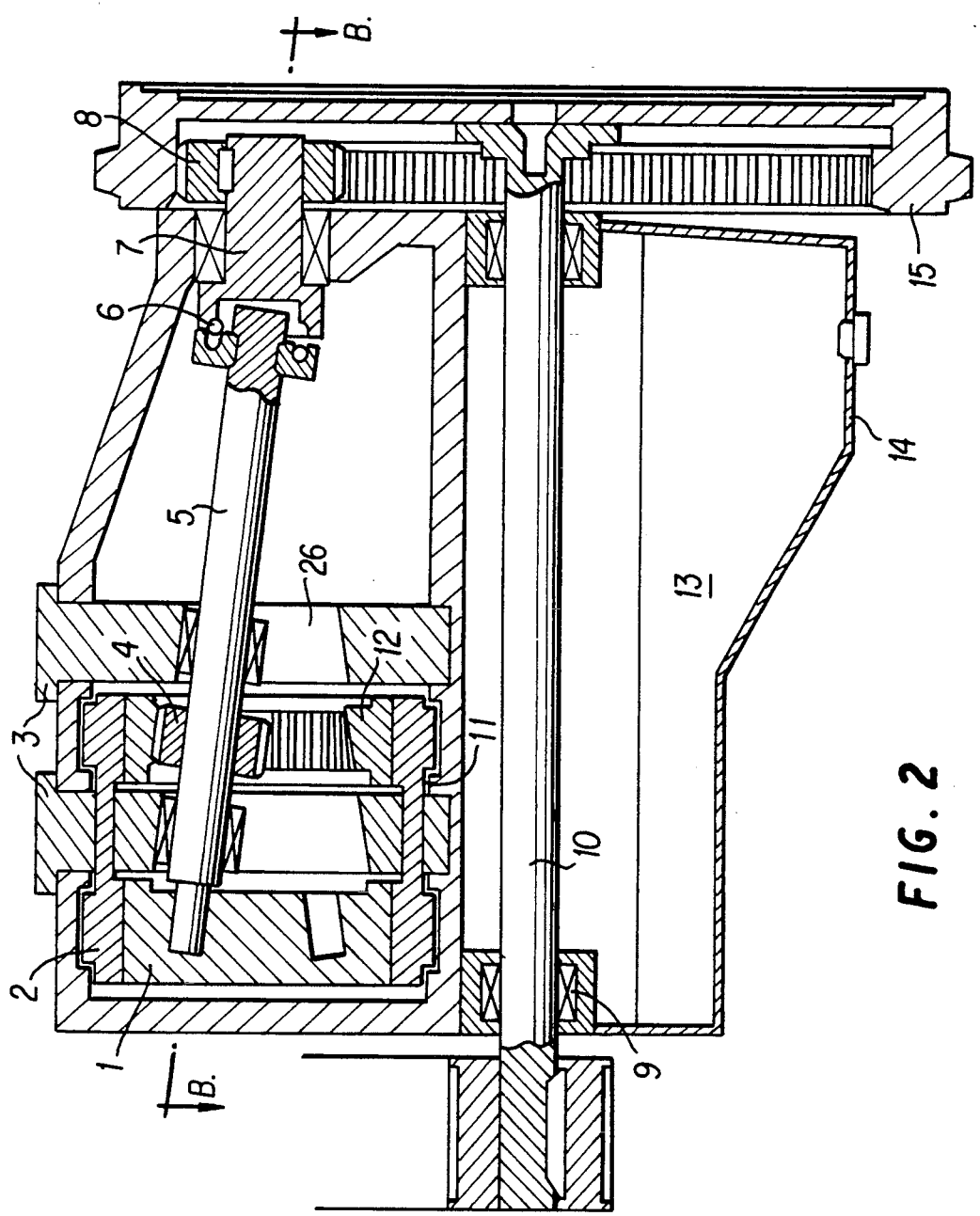
FIG. 2 is a side elevation of the engine of FIG. 1 taken along line 2—2 of FIG. 1.
Figure 3:
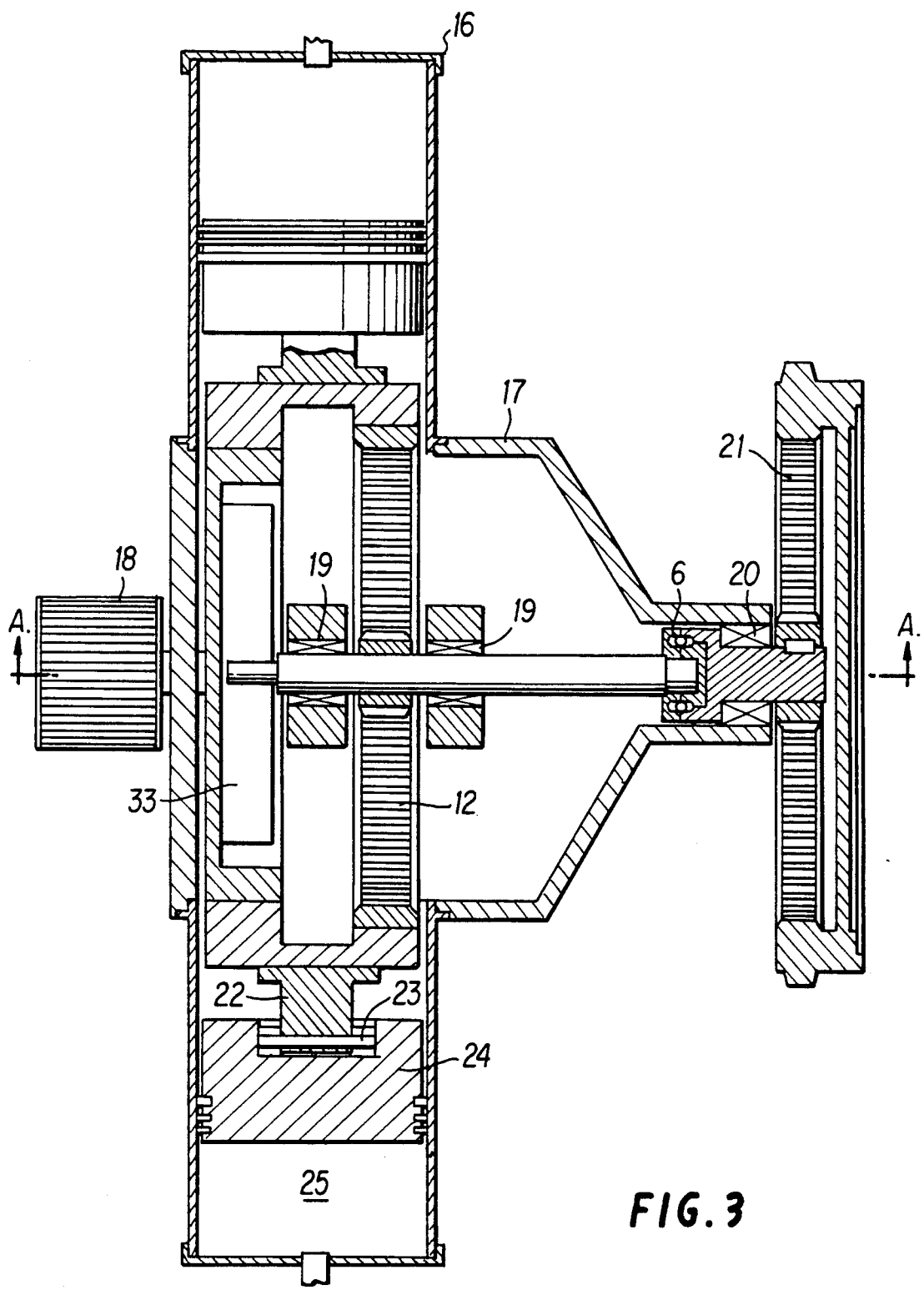
FIG. 3 is top elevation of the engine of FIG. 1 taken along line 3—3 of FIG. 1.

Referring to FIGS. 1, 2 and 3, conventional pistons 24 are housed in an engine stator body 25 which at distal ends is constructed to receive a conventional or modified head assembly 16 to complete working compression chambers. The opposed pistons 24 are mounted in opposed cylinders which are alternatively powered by, for example, injecting fuel therein and igniting the fuel according to conventional methods for operating internal combustion engines. In this way the pistons are pushed one at a time in alternative fashion in opposite direction. A wrist pin 23 which attaches piston 24 to a connecting post and thereby attaches the piston to a slider block carriage assembly 2, links the pistons into an assembly for reciprocating lineal movement in one direction.

An oval slider gear track 12 is attached and recessed in sliding block carriage assembly 2. On the back side of the oval slider gear track 12 there is attached and recessed the slider block guider channel 1. The sliding block carriage assembly 2 is guided by tracks covered by Teflon slider pads 11. The pads are mounted on tracks recessed into engine stator 25. Thrust support posts 3 are placed in front of and through the middle of the sliding block carriage assembly 2. The thrust support post 3 are fastened on the top and bottom of the engine stator 25 and are aligned perpendicular to the sliding block carriage assembly 2.

A floating shaft 5 has an end in the slide block guider channel 1 and rides on the guider roller surface 33. The floating shaft 5 extends outward through the thrust support posts 3 and is in the post. Floating shaft thrust bearings 19 pass through and over gear area in which a drive gear 4 is affixed and meshes with gear oval slider gear track 12. The floating shaft 5 continues outward and passes through the second thrust support post 3 and floating shaft thrust bearing 19 therein extends outward and is received by a constant velocity joint 6. Preferably, the constant velocity joint 6 is a fiber-type joint of the type used as universal joints on front wheel drive vehicles. The constant velocity joint 6 is affixed to a drive carrier shaft 7 which has drive carrier bearing 20 that hold the shaft 7 true. The other end of the drive carrier shaft 7 is coupled to drive gear 8 which meshes and drives the interiorly geared surface of a flywheel gear drive on a flywheel 15. The flywheel 15 is attached to an output drive shaft 10 which is supported as needed by output shaft bearings 9. A drive pulley 18 is attached adjacent the free end of the output shaft 10.

Figure 4:
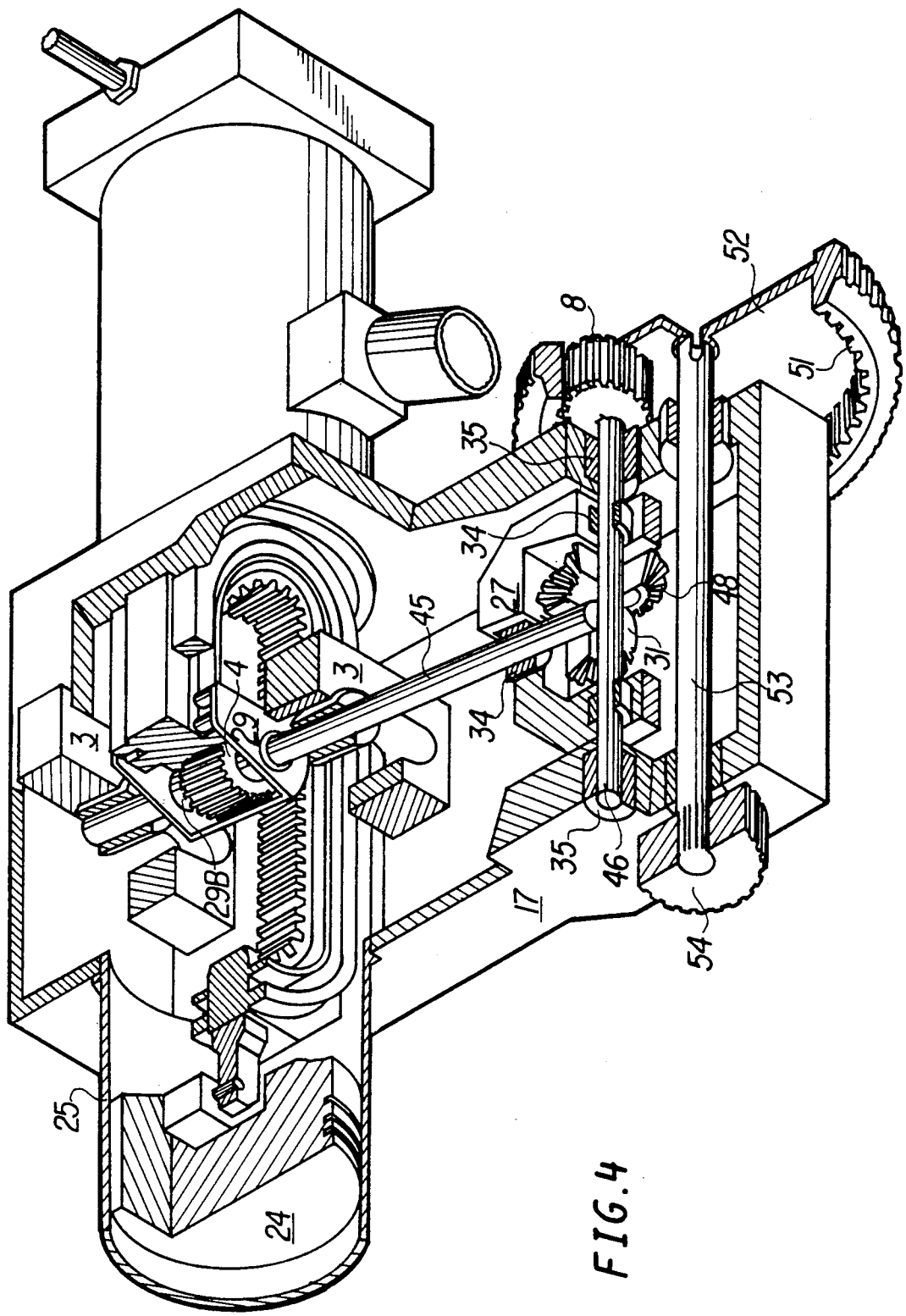
FIG. 4 is a perspective view, partially cut away, of a second embodiment of an engine configured in accordance with the instant invention.
Figure 5:
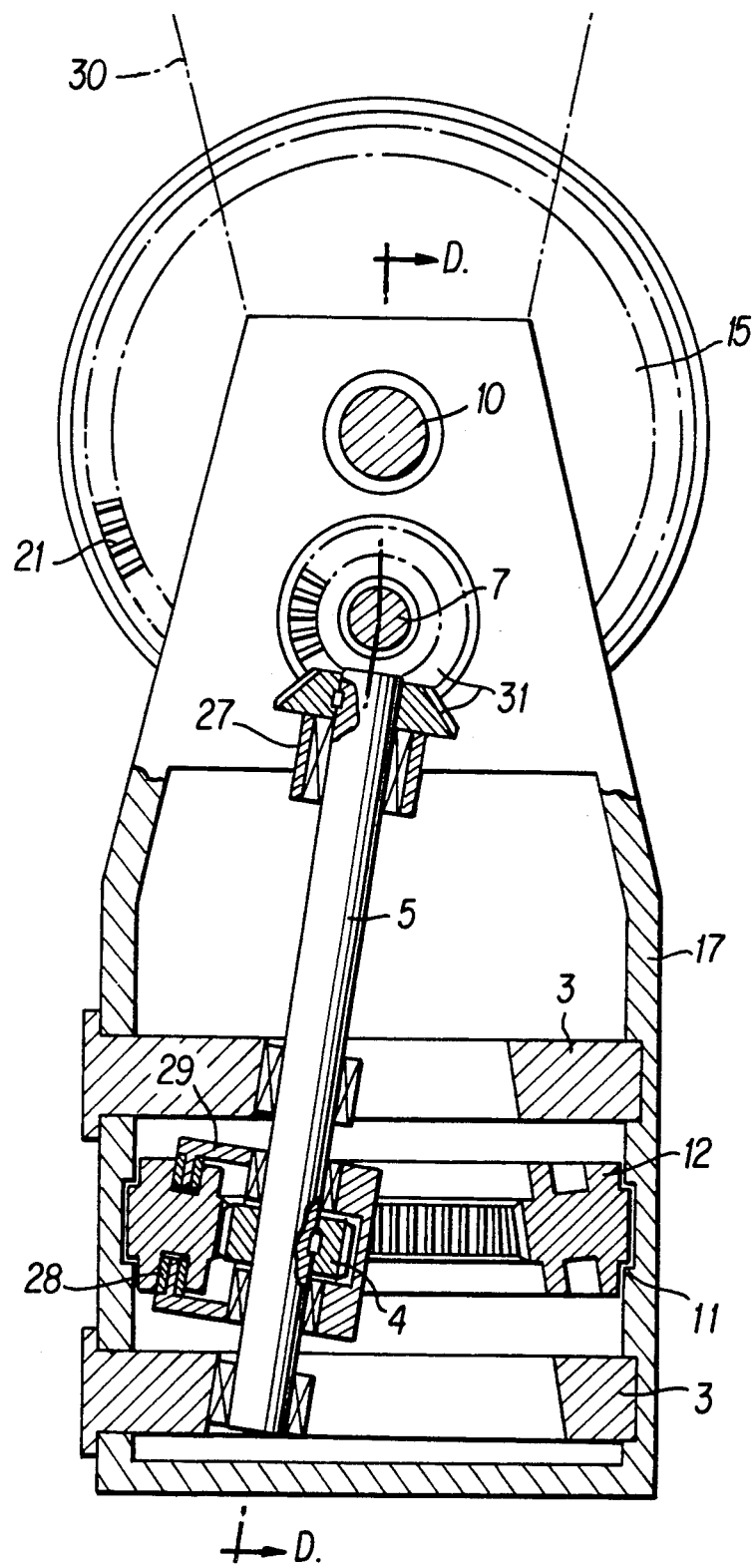
FIG. 5 is a side elevation of the engine of FIG. 4 taken along line 5—5 of FIG. 4.
Figure 6:
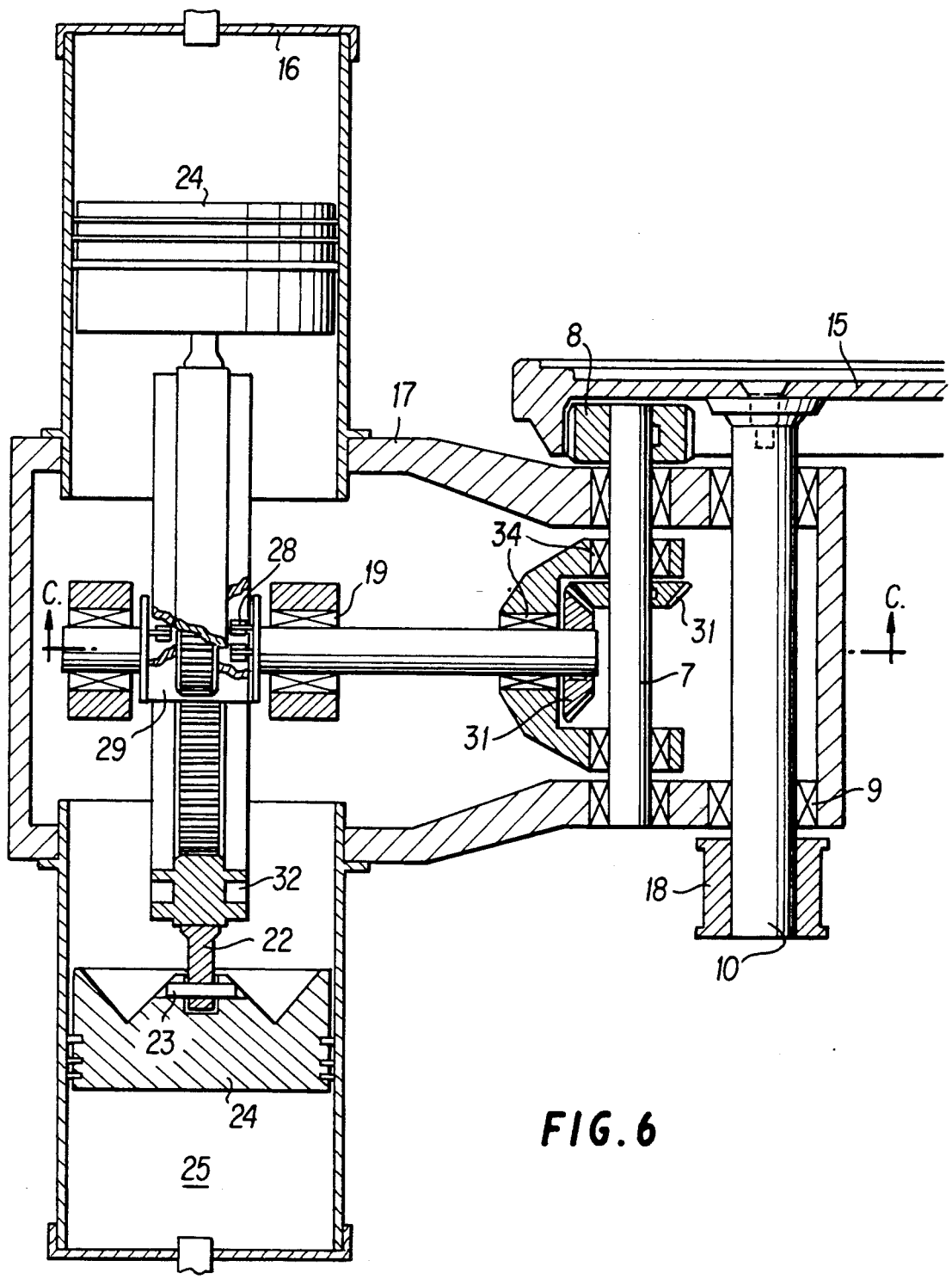
FIG. 6 is a top elevation of the engine of FIG. 4 taken along line 6—6 of FIG. 4.

Referring now to the second embodiment of the invention set forth in FIGS. 4, 5 and 6 where structure similar to that disclosed in FIG. 1 has similar reference numerals; it is seen that a shaft 45 begins in the bearing 19 in the slot in thrust post 3 and extends forward entering an interlocked guider assembly 29 and bearing 29B. Passing through the oval gear area in which the drive gear is affixed to the floating shaft 45 and meshing with the oval slider gear track 12, the floating shaft 45 continue forward, exiting through front side of interlocked guider assembly 29 and bearing 29B. The shaft 45 thereafter continues forward, passing through the second thrust support post 3 and is supported by bearings 19 in the post. The shaft 45 then continues outward and enters bearing 34 in housing 27. A conical gear 31 is attached to the end of the shaft 45.

Positioned perpendicular to the conical gear is a drive corner shaft 46 journaled in bearing 35 mounted in the housing 17. The shaft 46 extends through the thrust angulating housing assembly 27 and is journalled therein by angulating housing bearing 34. The shaft 46 receives the thrust angulating gear 48 and meshes with the floating shaft gear 31. The shaft 46 continues through the angulating housing bearings 34 which are housed in the thrust angulating housing assembly 27, passes through right bearing 35 and is attached to drive gear 8 which meshes and drives the internal gear surface 51 to the flywheel 52. This is attached to an output drive shaft 53 which is journalled as needed by bearings 54. An output drive pulley 54 is attached to shaft 53.

Figure 7:
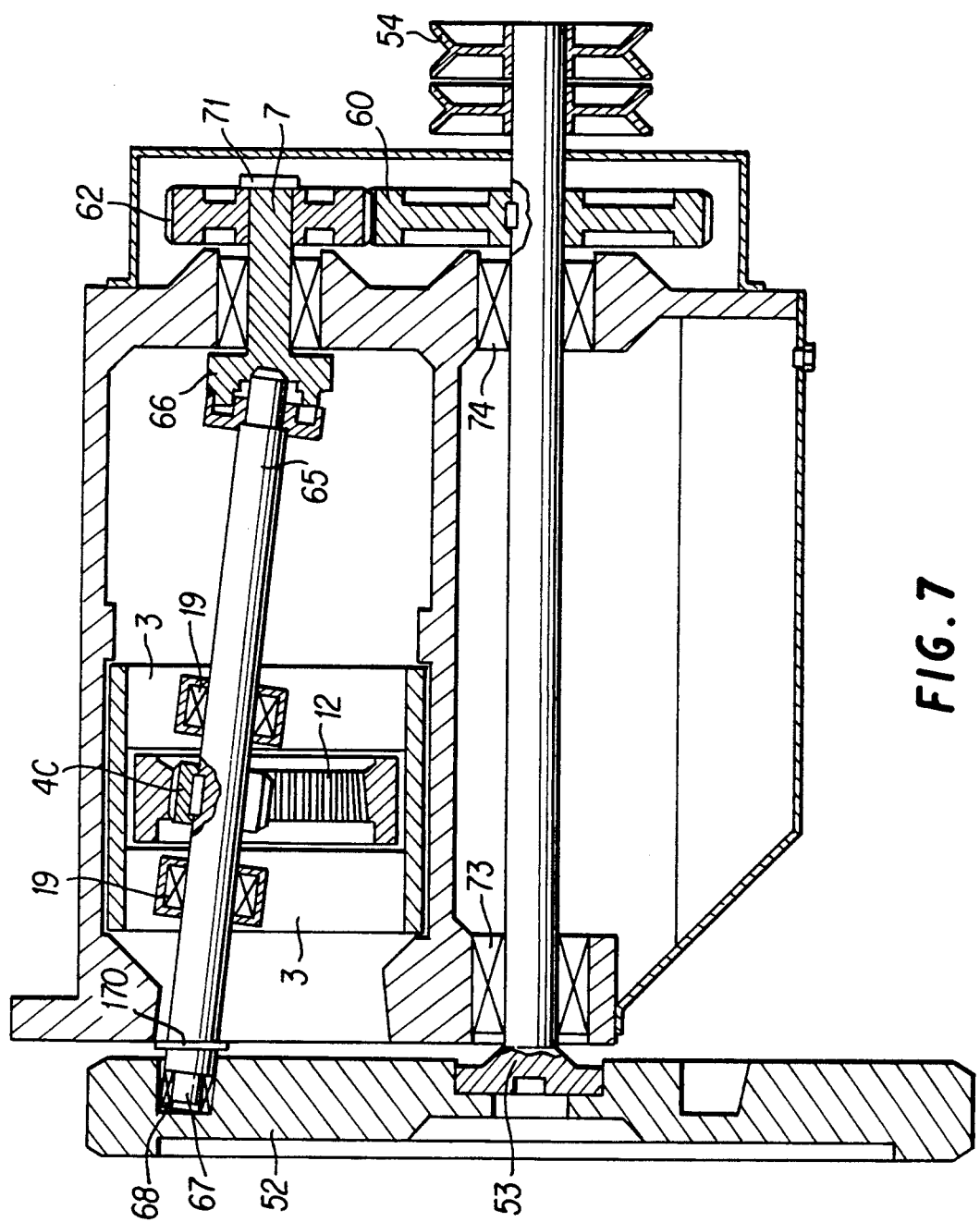
FIG. 7 is a side elevational view showing a third embodiment of the invention.
Figure 8:
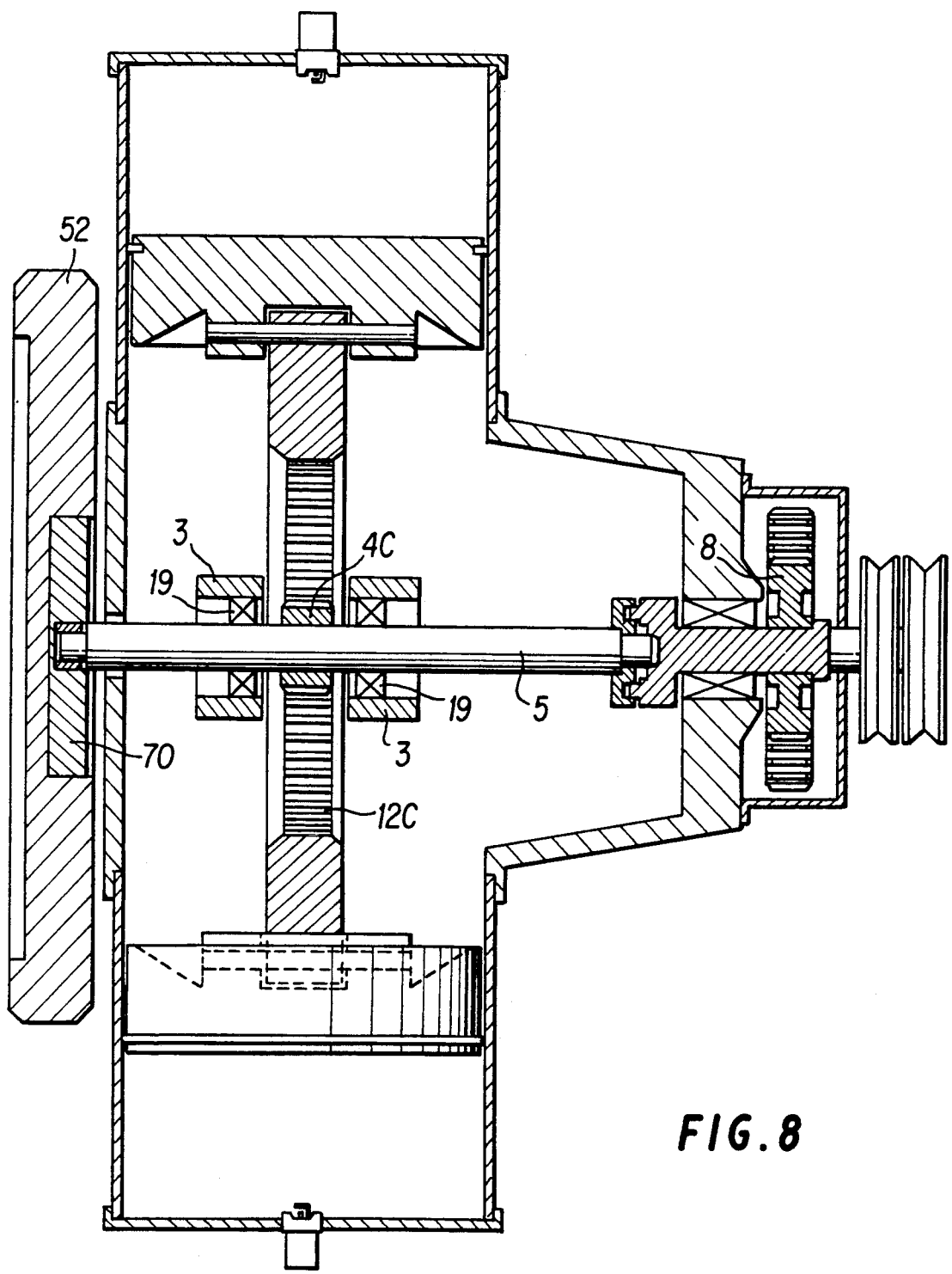
FIG. 8 is a top elevational view showing the embodiment of FIG. 7.
Figure 9:
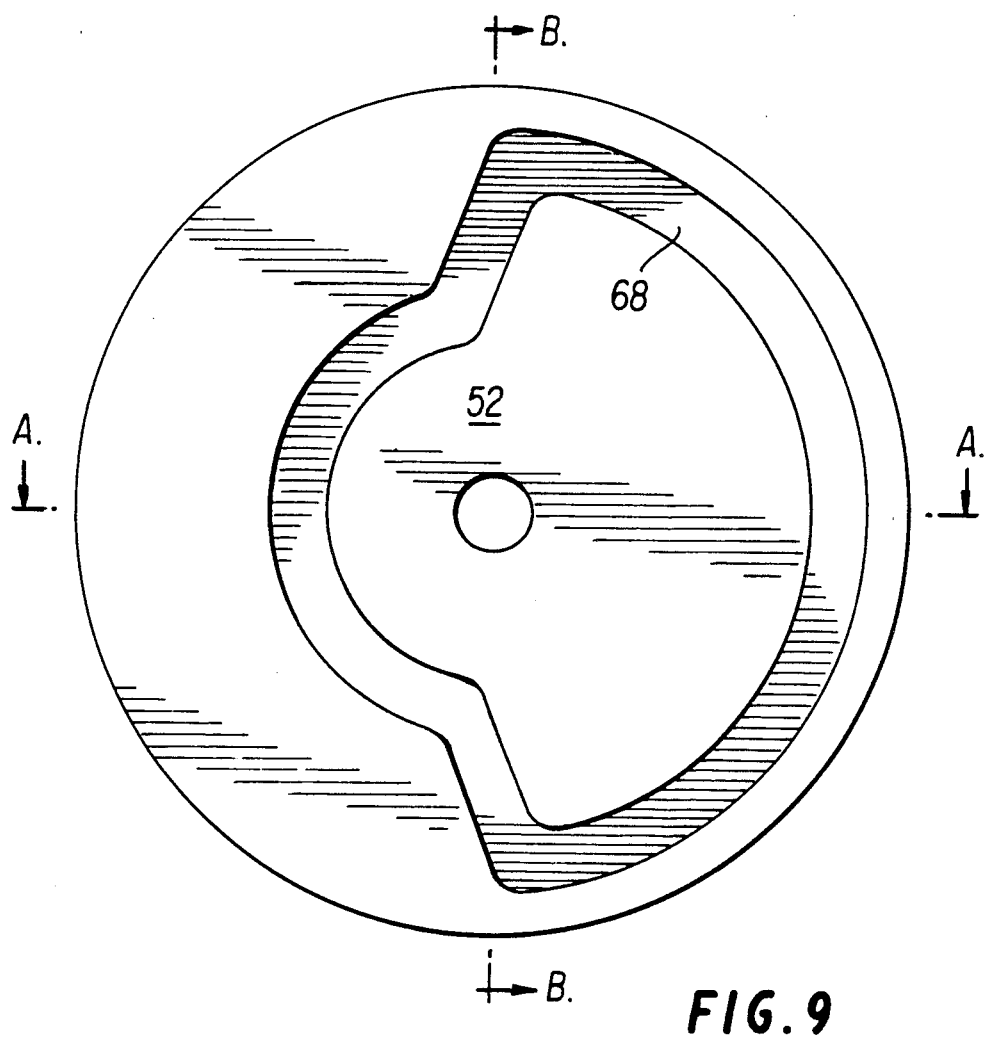
FIG. 9 is a rear view of a flywheel with a groove therein for converting the motion of the oscillatory shaft to rotary motion about a stationary axis.
Figure 10:
FIG. 10 is a cross-section taken along lines 10—10 of FIG. 9.
Figure 11:
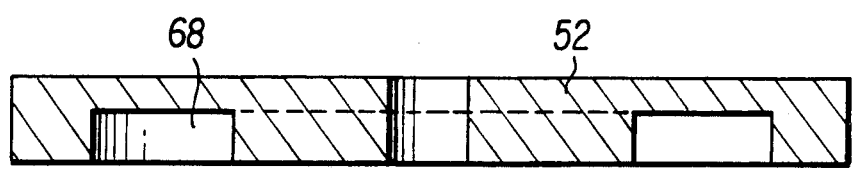
FIG. 11 is a cross-section taken along lines 11—11 of FIG. 9.

Referring now to FIG. 7, there is shown a third embodiment of the invention, wherein the oscillating shaft 65 is restrained at one end by a constant velocity joint 66 and has its free end 67 received in a groove 68 disposed in a flywheel 52. The flywheel 52 is mounted on a shaft 53, which is journalled in the engine housing by bearings 73 and 74. The shaft 53 has a gear 60 at the end thereof, which meshes with a gear 62 that is journalled on the shaft of the constant velocity joint 66. Pulleys 54 are also mounted on the end of the shaft 53 to take power therefrom. As seen in top view of FIG. 8 and in FIGS. 9-11, the slot 68 in the flywheel 52 is configured to give the flywheel 52 a constant velocity as the oscillating shaft 65 is driven by the linearly oscillating rack 12.

Figure 12:
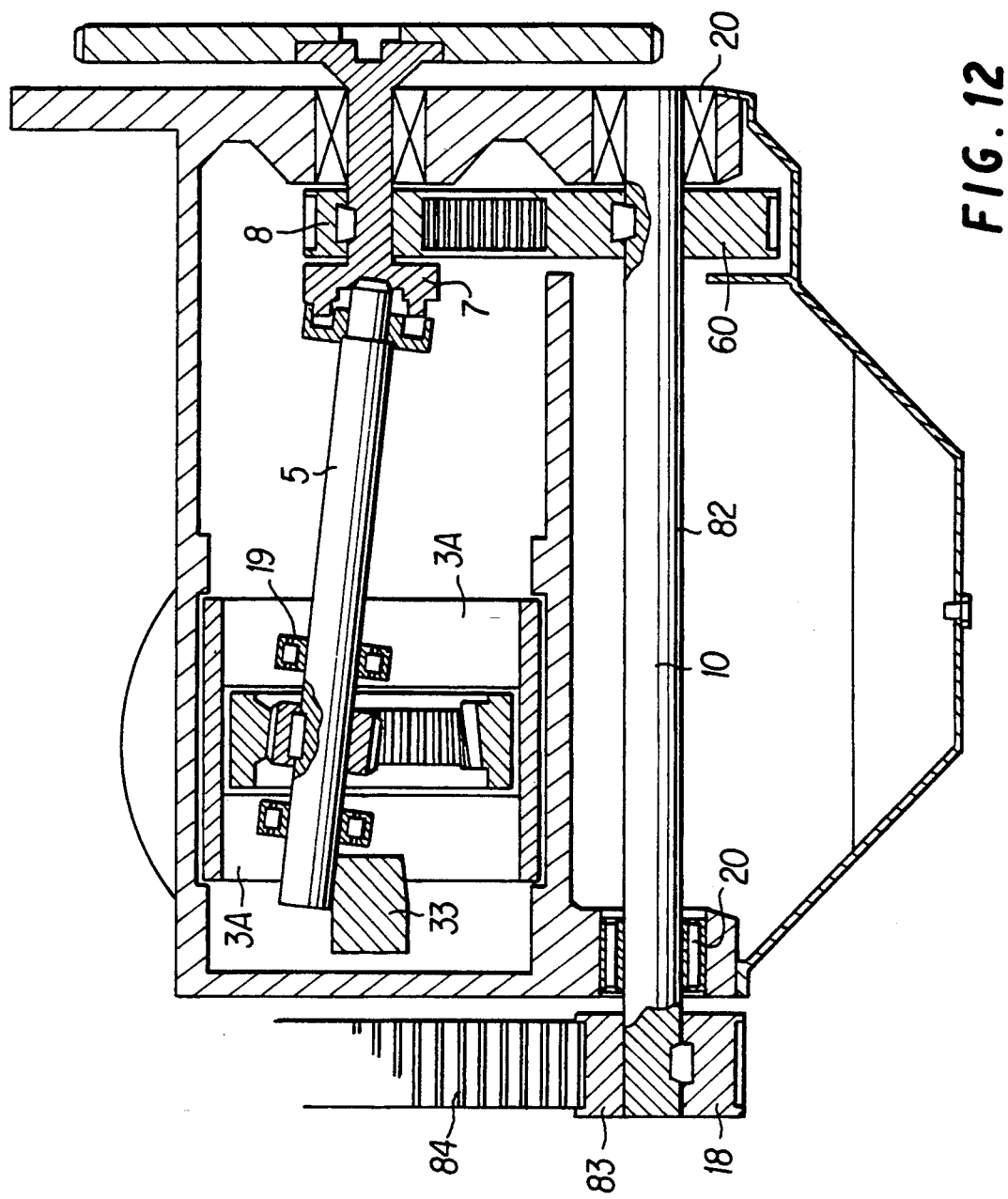
FIG. 12 is a side elevational view of a fourth embodiment of the invention.
Figure 13:
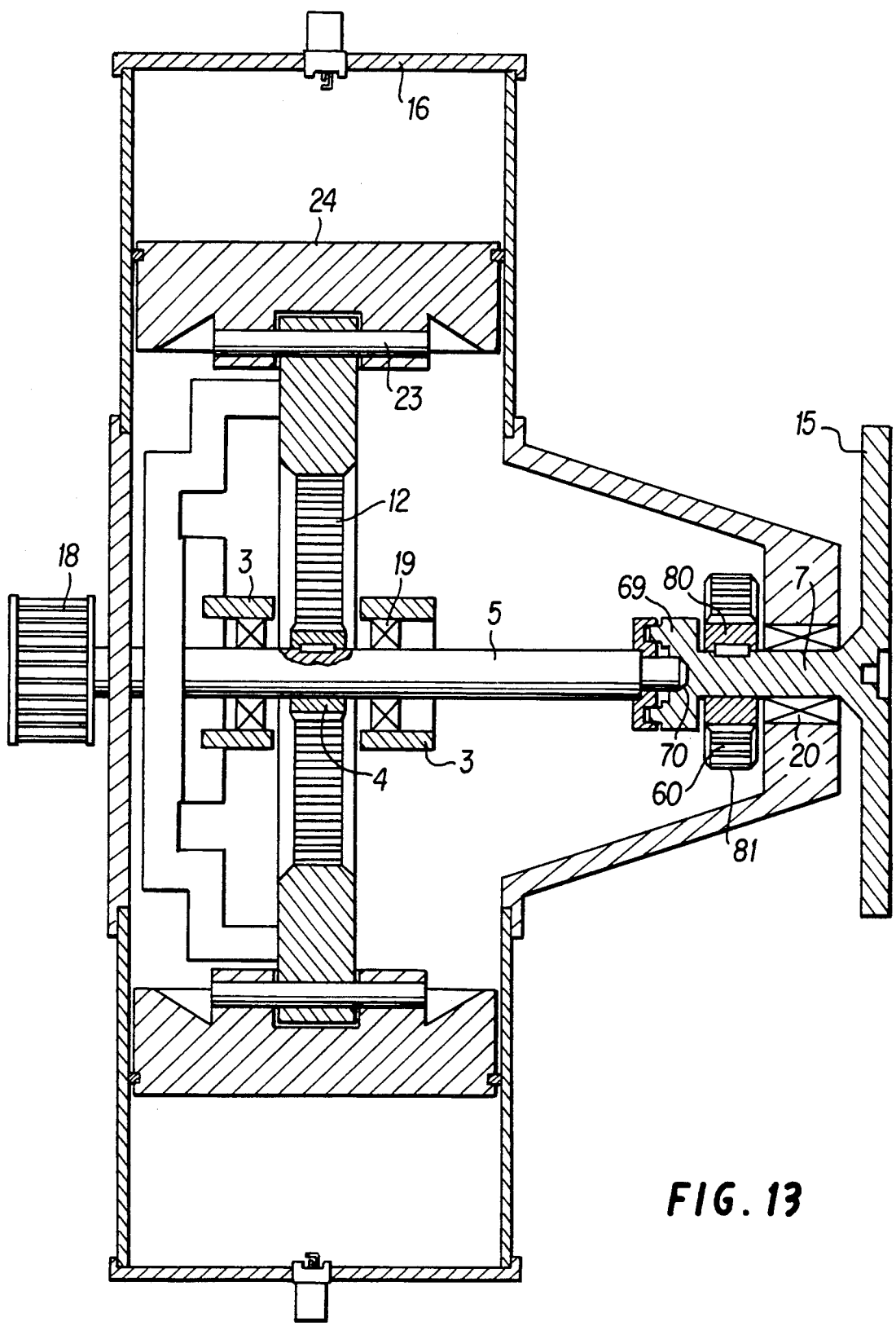
FIG. 13 is a top elevational view of the embodiment of FIG. 12.

Referring now to FIGS. 12-13, there is shown a fourth embodiment of the invention, wherein flywheel 15 is driven by rotating, oscillating drive shaft 5 as the drive shaft pivots about area 70 in swash plate 69. The swash plate 69 drives a first gear 80, which meshes with a second gear 81 that, in turn, drives a shaft 82 (FIG. 12) to rotate a third gear 83. The gear 83 meshes with output gear 84. The aforedescribed structure utilizes the linearly oscillating rack 12 used in embodiments 1, 2, and 3 of the invention.

Figure 15:
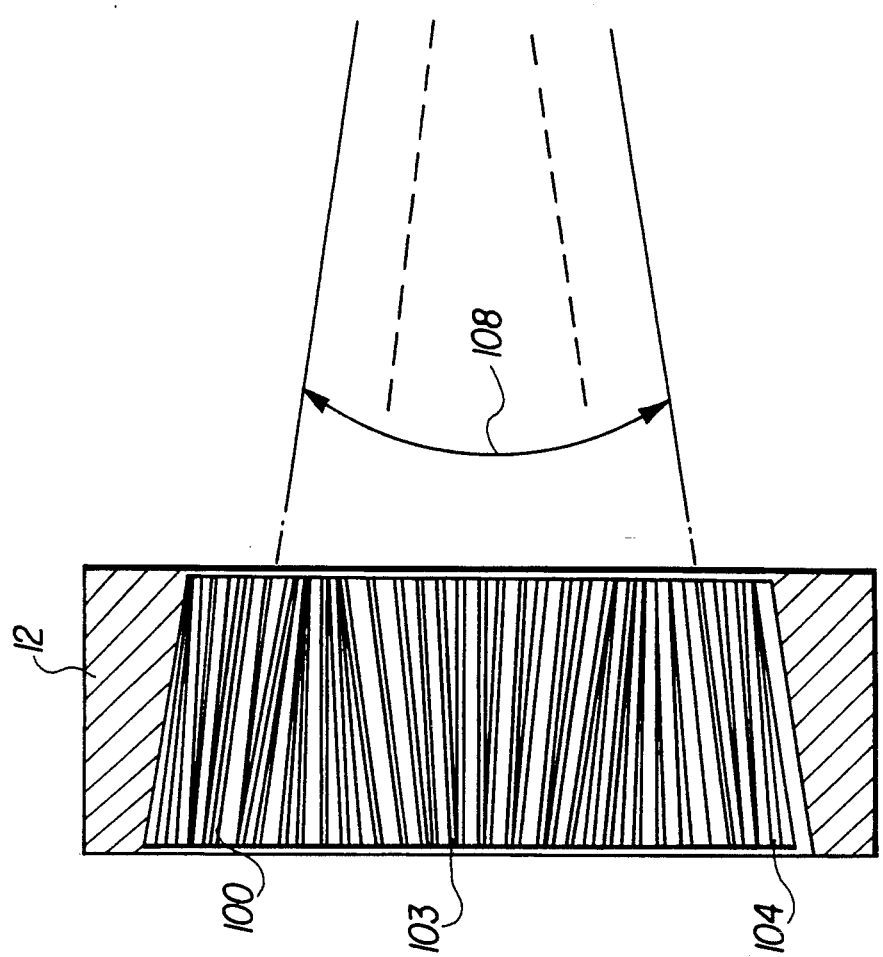
FIG. 15 is a side view looking into the track end portion shown in FIG. 14.
Figure 14:
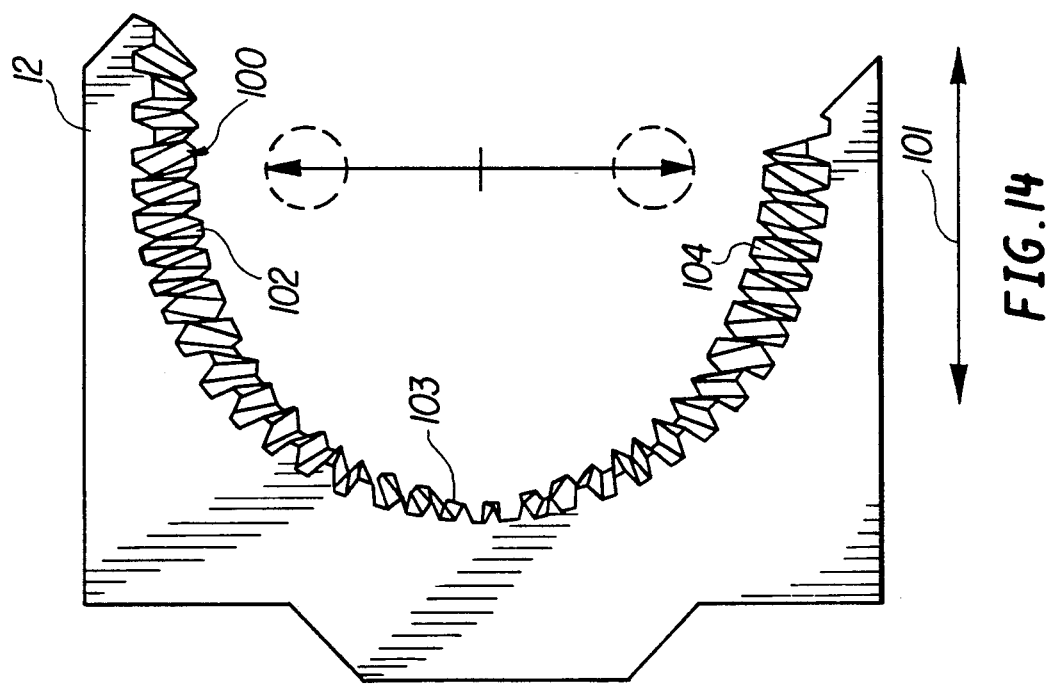
FIG. 14 is a front view of one end of the toothed track used in FIGS. 1-13, the other end of the toothed track being similarly configured.

Referring now to FIGS. 14-18, there is shown a tooth configuration for the rack 12, wherein the teeth, designated generally by the numeral 100, are shaped to accommodate linear oscillation of the rack 12 in the direction of arrows 101. As is seen in FIGS. 14 and 15, the teeth 102 at the top of the rack are shaped differently from the teeth 103 at the end of the rack and the teeth 104 at the bottom of the rack to accommodate oscillation of the gear 4 in drive shaft 5 in a plane orthogonal to the plane including arrow 101, as illustrated by arrow 108.

Figure 16A:
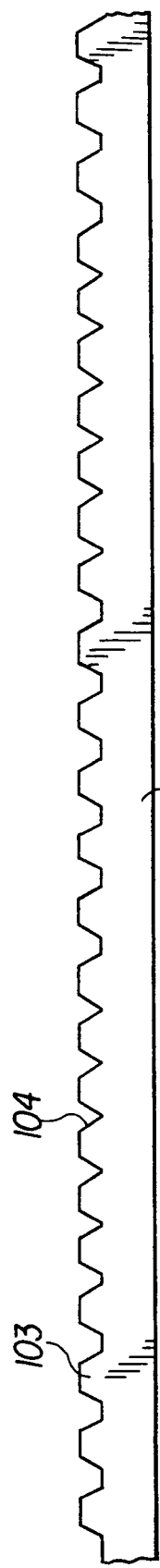
FIGS. 16A, 16B, and 16C are tooth profiles along the upper and lower straight sections of the track showing an edge view, a planar view, and an individual tooth.
Figure 16B:
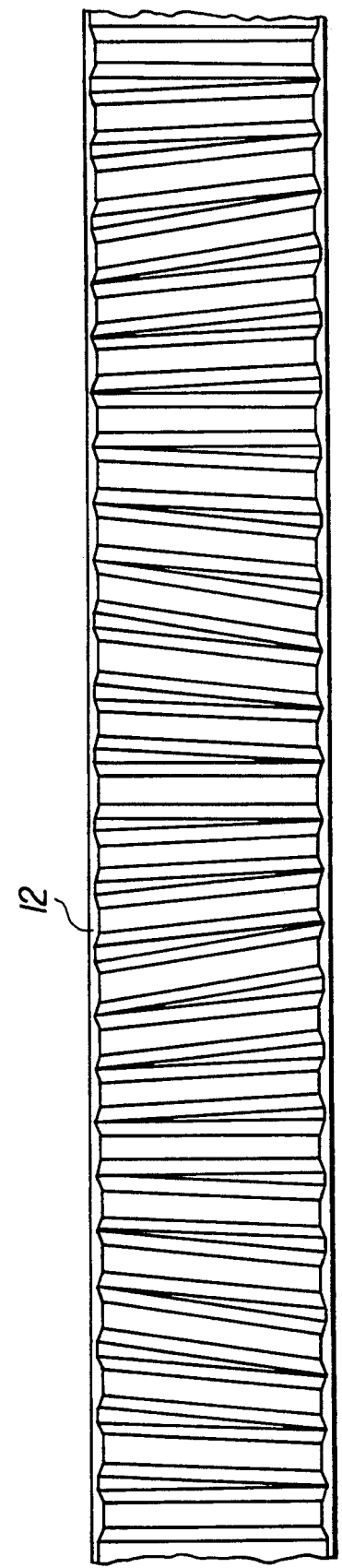
Figure 16C:
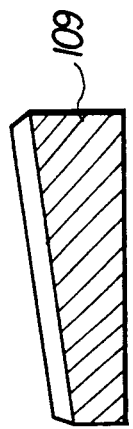

As is seen specifically in FIGS. 16A, 16B, and 16C, the wedge-shaped gear teeth 109 are shown with a repetitive pattern, which repeats over the straight section of the rack 12D of FIG. 14.

Referring now more particularly to FIGS. 17 and 18, it is seen that the gear 4 has an array of teeth 120, which are designed to mesh with the array of teeth of the track 12, the same manner as the gear teeth on the track 12 repeat their pattern. Consequently, the gear 4 does not bind on the teeth 100 of the track 12.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An engine, such as an internal combustion engine, wherein the engine comprises:
   at least first and second opposed pistons, the pistons having pressure faces in opposite directions;
   cylinder means enclosing the face of each piston and means for applying pressure alternatively to one piston face and then the other;
   a connecting assembly for connecting the two pistons together;
   means for restraining the connecting assembly to only straight-line, reciprocal motion with respect to the cylinder means over a straight-line path of motion;
   means for connecting the pistons to the connecting assembly, the connecting means being restrained from moving laterally with respect to either the piston or the assembly;
   an enclosed track, within the connecting assembly, the enclosed track including opposed spaced apart straight-toothed sections joined by semi-circular end-toothed sections to form a continuous, internally toothed surface;
   a circular gear received within the track and meshed thereto;
   a drive shaft connected to the gear and having an axis extending in a plane perpendicular to a plane including the path of motion of the connecting assembly;
   means in engagement with the drive shaft for holding the gear in continuous engagement with the track;
   means for restraining the shaft to rocking motion as the drive shaft rotates about its axis with the axis of the drive shaft remaining in a plane oriented normally to the plane including the direction of motion of the assembly;
   an output shaft aligned with the drive shaft; and
   coupling means for connecting the drive shaft to the output shaft wherein as the drive shaft rotates and oscillates, the output shaft rotates.

2. The engine of claim 1 wherein the coupling means the drive shaft to the output shaft is a constant velocity joint.

3. The engine of claim 1 wherein the output shaft is oriented perpendicular to the drive shaft, and wherein the coupling means comprises a conical gear on the drive shaft meshing with a conical gear on the output shaft, means being provided for holding the conical gears in engagement with one another while allowing the drive shaft to track with respect to the output shaft.

4. The engine of claim 3 wherein the means for holding the gear in engagement with the internal track comprises a U-shaped bracket and a track parallelling the internal track, the U-shaped bracket having bearing means thereon which is engaged with a paralleling track parallel with the internal track to hold the drive gear in engagement with the internal track.

5. The engine of claim 4 wherein there is a gear attached to the drive shaft and a flywheel having gear teeth thereon which mesh with the gear attached to the output shaft, the flywheel having a shaft thereon for running whatever device is to be driven by the engine.

6. The engine of claim 1 further including a flywheel having an internal surface with gear teeth thereon, and wherein the output shaft has a pinion gear in engagement with the internal teeth of the flywheel to rotate the flywheel as the pinion gear is rotated.

* * * * *